United States Patent [19]

Kerhoas et al.

[11] 4,259,871
[45] Apr. 7, 1981

[54] GYROSCOPES

[75] Inventors: Jean-Claude Kerhoas, Hanches by Epernon; Gilles Cattan, Arpajon, both of France

[73] Assignee: Societe de Fabrication d'Instruments de Mesure S.F.I.M., Massy, France

[21] Appl. No.: 845,440

[22] Filed: Oct. 25, 1977

[30] Foreign Application Priority Data

Jun. 6, 1977 [FR] France .................. 77 17226

[51] Int. Cl.³ .................. G01C 19/28; G01C 19/30
[52] U.S. Cl. .................. 74/5.46; 74/5.6 E
[58] Field of Search .................. 74/5.6 E, 5.46

[56] References Cited

U.S. PATENT DOCUMENTS 3,477,298  11/1969  Howe .................. 74/5.6 E X
3,540,289  11/1970  Ivers .................. 74/5.6 E X

FOREIGN PATENT DOCUMENTS 2064332  8/1978  Fed. Rep. of Germany ......... 74/5.6 E Primary Examiner—Rodney H. Bonck
Attorney, Agent, or Firm—Mason, Kolehmainen, Rathburn & Wyss

[57] ABSTRACT

A gyroscope comprises a rotor driven by a motor shaft through the intermediary of an intermediate ring connected to the motor and to the rotor by torsion bars at 90° with respect to each other and precession motors for applying to the rotor, precession torques in planes containing the axis of rotation of the drive shaft. Precession motors are fixed electromagnets exerting a force of attraction on the rotor. A system for supplying current to the electromagnets is provided, reacting to a control by an electrical control signal, this system having a response such that the attraction torque exerted by a pair of diametrically opposed electromagnets is a linear function of a parameter of the signal for controlling the current applied to the electromagnets.

The gyroscope may have an elastic suspension and be intended to rotate at high speed.

2 Claims, 7 Drawing Figures

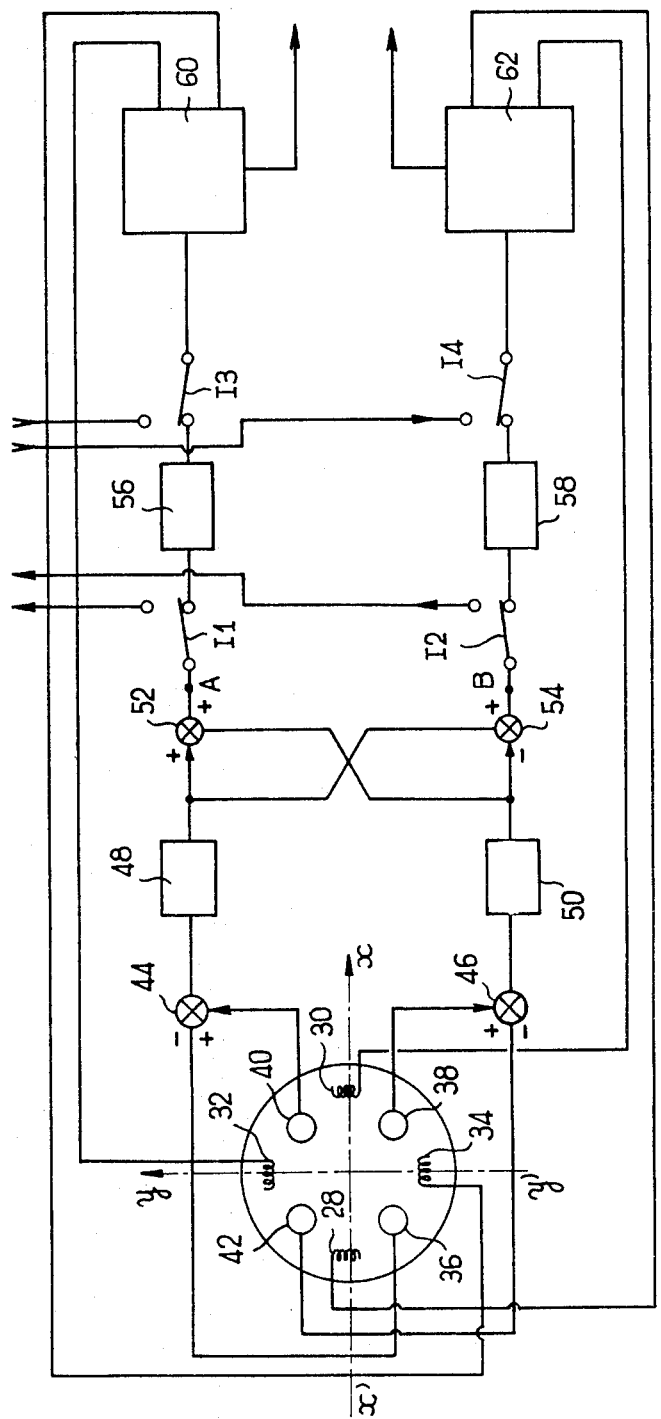
FIG_4

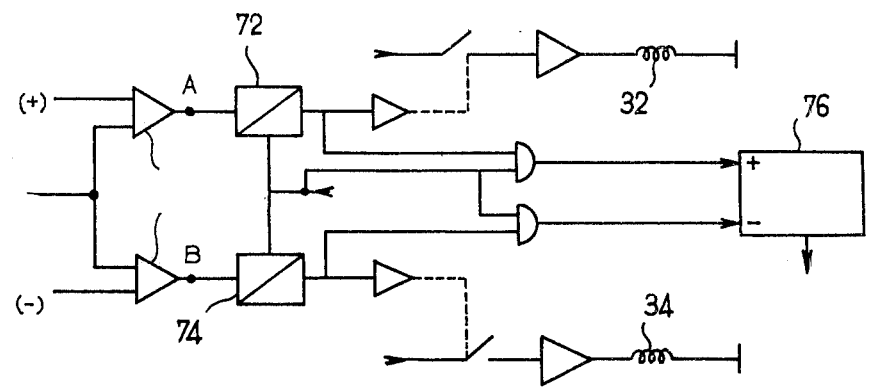
FIG_6
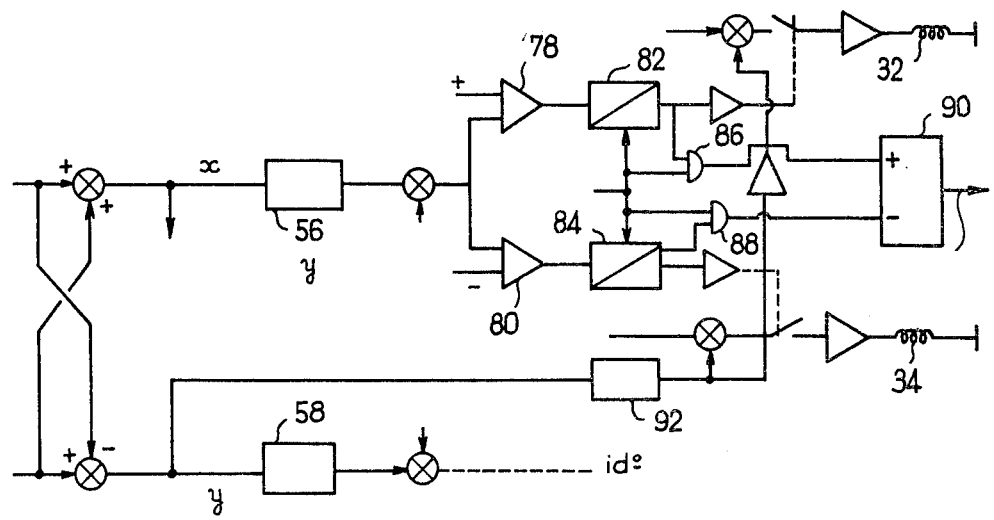
FIG_7

GYROSCOPES

The present invention relates to gyroscopes and more particularly gyroscopes having two degrees of freedom with an elastic suspension, with which precession motors or torque motors capable of imposing or compensating for a precession of the gyroscope rotor are associated.

Gyroscopes of this type have several types of application and in particular applications as members for registering attitude in a control system for the stabilization of a platform or any other object, or as gyrometers, i.e. members for measuring the angular speed of moving objects supporting the gyroscope, for example with a view to their automatic piloting.

In its application as a gyrometer, the gyroscope rotor is controlled with respect to its casing i.e. with respect to the object which supports the latter, this is by virtue of means for detecting the inclination of the rotor and torque motors controlled by the control system such that they permanently return the rotor to a central reference position. The precession torque or precession compensation torque which it is necessary to apply to the gyroscope rotor are thus measured and from this one deduces a speed of rotation of the object supporting the gyrometer, since the precession torque is proportional to this speed.

In an application as an element for registering attitude for the stabilization of a platform, one controls the torque motors to impose a precession torque as a function of the attitude to be imparted to the platform.

In these applications and above all in its application as a gyrometer, it is essential to be able to make a correct measurement of the torque applied by the precession motors. Now in general, it is possible for these torques to be measured solely by virtue of knowledge of the response characteristics of the torque as a function of the control of the motor.

In particular, it is essential that for electric motors, there is a linear relationship between the torque produced and the intensity or voltage, or another electric parameter of the signal for controlling the motor.

Most current gyroscopes having an elastic mechanical suspension (i.e. in which the rotor is fixed by means of torsion bars to an intermediate rigid ring which is itself fixed to the drive shaft for driving the rotor by torsion bars at right angles to the former) use precession motors composed of a permanent magnet and a coil through which a current passes. In fact, their major advantage is that they produce an attraction force or torque exactly proportional to the current passing through the coil. Now this current can be measured perfectly.

Unfortunately, the major drawback of these precession motors having a permanent magnet is that the torque produced is relatively low, the ratio of torque to electric power consumed being poor.

This is very inconvenient when applied to gyrometers for which a high rotary speed of the gyroscope rotor is necessary (in order to minimise drift errors of the apparatus), high precession torques thus being necessary in order to act on this rotor rotating at high speed. The present invention proposes a gyroscope in which the precession motors are electromagnets which act on a part of the rotor made of ferromagnetic metal. The electromagnets are separated from the axis of the rotor and are arranged in pairs of two electromagnets diametrically opposed with respect to this axis in order to exert a force of attraction on the periphery of the rotor, either on one side or the other in a direction parallel to the axis of the rotor.

The force developed by an electromagnet may be high, since it increases as a square of the current applied and the ratio of this force to the power consumed by the electromagnet is very favorable.

In addition, a torque motor comprising an electromagnet of this type has the advantage of having low bulk and of requiring on the rotor solely a ring of ferromagnetic metal in order to close the magnetic field lines created by the electromagnets.

However, the drawback of this construction of torque motors is that the force or torque produced by an electromagnet is not a linear function of the current applied.

This is why the present invention proposes to add to the precession electromagnets, a current supply system reacting to a control by an electric control signal, this system having a response such that the attraction torque exerted by two opposed electromagnets is virtually a linear function of a parameter of the signal for controlling the current applied to the electromagnets.

In other words, in view of the fact that the torque produced by an electromagnet is not a linear function of the current which passes through the latter, the currents in two diametrically opposed electromagnets are controlled by a control signal such that this control signal has a parameter which is a linear function of the torque produced by the electromagnets.

The diametrically opposed electromagnets may be supplied with a common polarization current, which produces no torque since the forces of attraction produced by each electromagnet are exerted symmetrically at two diametrically opposed points of the rotor. One thus produces a torque by applying a variation of current added algebraically to the common polarization current, with a positive sign at one of the electromagnets and with a negative sign at the other. The torque produced is thus a linear function of this current variation which constitutes the above mentioned parameter representing the torque applied.

The common polarization current introduces an inflexibility of reaction of the rotor to an attraction by the precession motors and this inflexibility opposes the stiffness introduced by the suspension bars of the rotor such that an appropriate choice of the value of the polarization current makes it possible to compensate exactly for the stiffness of the suspension bars, without using mechanical means for tuning the gyroscope.

It is also possible to provide an automatic adjustment of the polarization current depending on the inclination of the rotor with respect to its drive shaft, in order to compensate for the fact that the torque developed by each electromagnet depends on the airgap width between the electromagnet and the ring for closing the magnetic field supported by the rotor. Means for detecting the inclination of the rotor or airgap width should thus be provided for controlling the polarization current.

Another method of controlling the electromagnets, making it possible to produce a control signal parameter which is a linear function of the torque produced, consists of supplying the diametrically opposed electromagnets with current pulses : the mean torque produced during one rotation of the rotor is substantially proportional to the difference between the times of passage of the current (the amplitude is assumed to be identical for both electromagnets) in each electromagnet. It is this difference in the time of passage of the current which constitutes the chosen parameter of the signal for controlling the electromagnets.

This difference in the time of passage may result either from the fact that pulses of calibrated width are produced in a number varying according to the torque to be developed, or from the fact that pulses of constant frequency have widths varying according to the torque to be produced.

It is also possible to vary the amplitude of the pulses depending on the inclination of the rotor (or on the airgap width in the vicinity of the electromagnets) in order to take into account the fact that the force of attraction produced by each electromagnet depends greatly on the airgap width in the vicinity of this electromagnet.

In this case, it is desirable to supply each electromagnet with successive pulses of alternate signs in order to eliminate remanant magnetization of the iron core of the electromagnet.

Further features and advantages of the invention will become apparent on reading the ensuing detailed description which refers to the accompanying drawings in which:

FIG. 1 shows a diagrammatic example of the gyroscope having an elastic suspension by means of torsion bars, FIG. 2 is a sectional view of the gyroscope of FIG. 1 showing the arrangement of the precession electromagnets, FIG. 3 is a diagrammatic plan view of the arrangement of electromagnets and detectors of the gyroscope, FIG. 4 is a general block diagram of a loop circuit of the gyroscope, capable of facilitating operation as a gyrometer in particular.

FIG. 6 is a diagram of a circuit for supplying current by pulses of variable frequency, FIG. 7 is a diagram of a circuit for supplying current by pulses of variable width with compensation of the amplitude of the pulses depending on variations in the inclination of the rotor.

Figure 1:
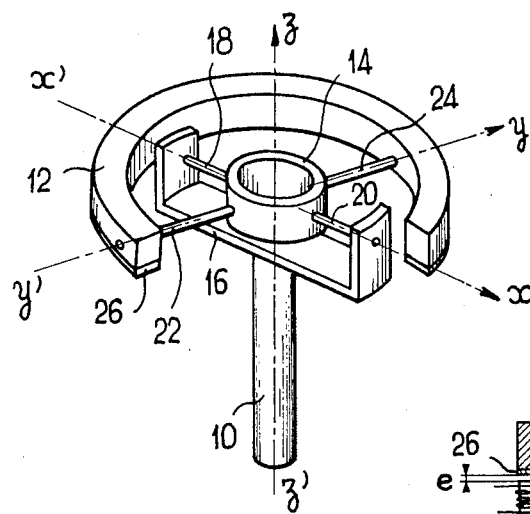
FIGS. 1 to 3 show very diagrammatically, one example of the structure of the gyroscope having an elastic suspension, to which the present invention relates in particular.

A gyroscope of this type comprises a drive shaft 10 connected to a motor (not shown) in order to cause a rotor or flywheel 12 of the gyroscope to rotate.

The shaft is not connected to the rotor directly, but by an elastic suspension capable of facilitating the transmission of the rotary movement whilst allowing the rotor one or two (in this case two) degrees of freedom such that the axis of rotation of the rotor may assume an orientation different from that of the drive shaft 10 within relatively restricted clearance limits (for example several degrees about the axis z'z of the drive shaft).

The elastic suspension is of the type known as a "Hooke's coupling". It comprises an intermediate rigid rotating ring 14 between the drive shaft and the rotor to be driven and this ring is connected firstly to the drive shaft (or in the example shown to a stirrup-piece or strap 16 integral with the drive shaft and surrounding the ring 14) by two aligned torsion bars 18 and 20 and secondly, to the rotor by two other torsion bars 22 and 24 at right angles to the two former torsion bars, the point of intersection of the directions of the bars 18, 20, 22 and 24 being located on the axis z'z.

The torsion bars are capable of undergoing torsion about their own direction of elongation and are preferably as resistant as possible to bending stress at right angles to this direction. Bars whose cross section is in the form of a cross are particularly well suited. It is these perpendicular torsion bars, connecting the ring 14 to the shaft 10 and to the rotor 12, which facilitates the transmission of rotation with two degrees of freedom.

In most applications of such gyroscopes, it is necessary to provide motors known as torque motors or precession motors for applying to the rotor 12 torques which tend either to impart an angular speed of precession to the axis of rotation of the rotor, or to compensate for such a speed of precession which would be introduced by an angular movement of the frame and of the drive shaft 10 of the gyroscope.

Torque motors are provided for applying torques orientated in the directions x'x and y'y.

A torque applied in the vectorial direction x'x produces an angular speed of precession about the axis y'y and vice versa.

Figure 2:
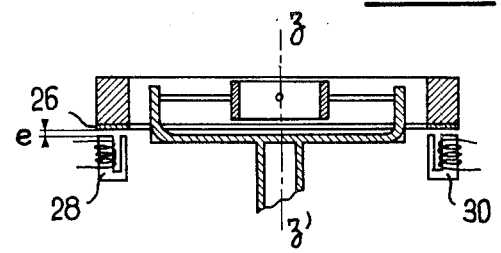

The present invention proposes to use precession motors constituted by the electromagnets which act on a ferromagnetic ring 26 (FIGS. 1 and 2) supported by the rotor. A fixed electromagnet, separated from the shaft 10 and located in the vicinity of this ring such that it produces a force of attraction parallel to this shaft, creates a torque whose vectorial direction is perpendicular to the shaft.

One thus preferably provides four electromagnets 28, 30, 32, 34 for applying torques either in the direction x'x, in either direction (electromagnets 32 and 34 aligned on the axis y'y) or in the direction y'y in either direction (electromagnets 28 and 30 aligned on the axis x'x).

Each electromagnet is separated from the ferromagnetic ring 24 by an airgap of width e. This width is variable taking into account the two degrees of freedom of the gyroscope rotor.

The torque C produced by an electromagnet has a value proportional to the square of the current I applied to the latter and inversely proportional to the square of the width of the airgap between the electromagnet and the ring.

$$C = K\ (I^2/e^2)$$

Figure 3:
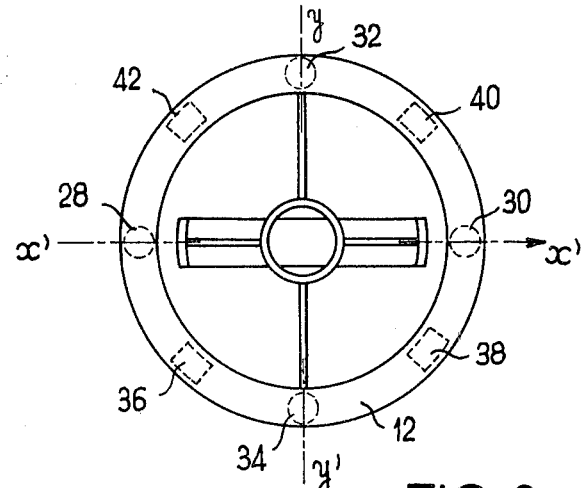

In an application as a gyrometer in particular, means are provided for detecting the inclination of the rotor, which make it possible to measure this inclination. These detectors are illustrated in FIG. 3. Since one wishes to know the inclinations about the axes x'x and y'y, but it is difficult to place detectors at the same point as the electromagnets, four detectors 36, 38, 40, 42 are provided between the electromagnets along axes at 45° to x'x and y'y. A simple change of axes by addition and/or subtraction of the signals provided by the detectors in pairs makes it possible to find the inclination about the axes x'x and y'y.

These detectors are shown diagrammatically in FIG. 3.

FIG. 4 shows an example of a loop circuit of the gyroscope facilitating its function mainly as a gyrometer or attitude detector in a system for controlling a platform.

This circuit comprises a system for the supply of current to the detectors, which system is not shown, a system (44, 46) for subtracting signals supplied by the diametrically opposed detectors in order to provide signals representing the inclination of the rotor along the axes on which the detectors are located (deviation signals of the position of the rotor with respect to its central position, in which the axis of rotation of the rotor is in alignment with the drive shaft 10). The deviation signals thus obtained are demodulated if necessary (demodulators 48,50), according to the system for supplying current to the detectors (alternating current or current pulses) and are subjected to a change of axes, by addition (adder 52) and subtraction (subtractor 54) of the deviation signals coming from the two groups of diametrically opposed detectors, in order to obtain deviation signals representing the inclination of the rotor (or its deviation with respect to its normal position) respectively along the axes x'x and y'y on which the torque motors are located.

The output A of the adder 52 supplies a signal corresponding to the deviation on the axis x'x. This signal is supplied by way of a conventional circuit 56 for correcting the control (which in particular ensures the stability of the control loop) to a circuit 60 for the linearisation and control of the electromagnets 32 and 34 located on the axis y'y.

Reciprocally, the deviation signal measured on the axis y'y is transmitted to the electromagnets of the axis x'x by a control correction circuit 58 located at the output B of the subtractor 54 and by a linearisation and control circuit 62 for the electromagnets 28 and 30.

When operating as a gyrometer, i.e. in which the gyroscope and its torque motors are used to measure an angular speed of displacement of the casing of the gyroscope, the detectors 36, 38, 40, 42 are used to detect an inclination of the casing with respect to the rotor and to provide a signal for controlling the torque motors in order to impose a precession in the opposite direction on the rotor, which compensates exactly for the angular speed of the casing, until the rotor reassumes its normal position with respect to the casing (axis of rotation of the rotor aligned with z'z). One thus measures the torques which it is necessary to impart to the motors comprising electromagnets, in order to obtain this compensation and the torque values measured represent the angular speed of displacement of the casing. This measurement takes place by means of the circuits 60 and 62.

The torque is applied to the axis at right angles to the axis on which an angular deviation has been detected, since it is known that a torque applied by a motor located on an axis tends to cause the rotor to rotate about this axis and thus to produce an inclination which can be measured along the other axis.

The loop circuit illustrated in FIG. 4 may also serve for an operation for controlling a platform, in which case the deviation signals produced at A and B must be sent to the motors controlling the platform itself, whereas precession controls are sent, from members indicating the position of the platform with respect to a frame, to the torque motors through the intermediary of linearisation circuits 60 and 62.

In FIG. 4, switches I1, I2, I3, I4 have been shown, to illustrate this double possibility of operation, the closed switches corresponding to the operation as a gyrometer, the open switches corresponding to control of a platform.

The linearisation circuits 60 and 62 are connected to the electromagnets according to the invention in order to take into account the fact that the response of the latter (torque depending on the current applied), is quadratic, whereas an appropriate measurement of the torque can take place solely if the torque varies in a linear manner depending on an electrical magnitude of a signal for controlling the electromagnets (this magnitude therefore not being directly the amplitude of the current applied).

Figure 5:
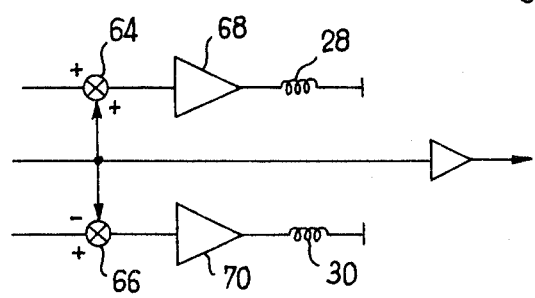
FIG. 5 is a diagram of a circuit for supplying current to a group of two diametrically opposed electromagnets.

Examples of linearisation circuits 60 or 62 are illustrated in FIGS. 5 to 7.

The circuit of FIG. 5 represents one embodiment in which the variable electrical magnitude, the measurement of which is a linear representation of the torque produced, is a variation $\Delta I$ of the current superimposed on a polarization current common to two diametrically opposed electromagnets (for example 28 and 30).

It will be understood that if the rotor is in the normal centered position, the application of a common current Io to two diametrically opposed electromagnets produces no torque.

If a variation of current $\Delta I$ is superimposed on this common current in an electromagnet with a positive sign and in the other with a negative sign, it will be seen that an imbalance of the forces of attraction is produced, causing a torque proportional to the difference of these forces of attraction, i.e. to $\Delta I$.

The variation of current $\Delta I$ therefore constitutes an electrical parameter of the signal for controlling two diametrically opposed electromagnets, a parameter which is proportional to the torque corresponding to this parameter.

FIG. 5 shows a corresponding very simple construction of the circuit 62, in which a reference voltage Vref is applied to one of the inputs of an adder 64 and a subtractor 66, whereas a deviation voltage Ve (which in the case of a gyrometer, may come from means for detecting the inclination of the rotor after a change of axes) is applied to a second input of the adder and subtractor respectively. The outputs of the latter are connected to amplifiers 68 and 70 respectively, which control the electromagnets.

The reference voltage applied along produces a common polarization current Io in the two electromagnets. The application of a surplus deviation voltage Ve produces a variation of current $\Delta I$ proportional to Ve, which is positive in the electromagnet 28 and negative in the electromagnet 30. It is possible to measure the torque produced by measuring $\Delta I$, therefore by measuring Ve. One output for measuring the torque or angular speed of precession is therefore provided after the input for the application of Ve.

It is advantageous to choose, as a particular value of the common polarization current Io, a value for which the gyroscope behaves as a free gyroscope. In fact, the polarization current creates a condition of negative stiffness opposing the return torque of the torsion bars. In other words, whereas the torsion bars tend to oppose the inclination of the rotor, the electromagnets supplied with a polarization current, on the contrary tend to reinforce the tendency of the rotor to be inclined. This is due to the fact that the force of attraction created by an electromagnet is inversely proportional to the square of airgap $$F = k (I_o^2 / e^2)$$

Thus, a slight inclination of the rotor tending to create an airgap variation δe produces a torque proportional to $-I_o^2 \times \delta e$, of opposed sign to the torque produced by the torsion bars. An appropriate choice of Io, taking into account the stiffness of the torsion bars and the force of attraction of the electromagnets for a given nominal airgap, makes it possible to adjust the gyroscope, i.e. to arrange that the beginning of an inclination of the gyroscope does not give rise to a return torque opposing this movement, a return torque which would give rise to a precession movement and thus to an inclination along the other axis.

Electrical means are thus available for adjusting the tuning of the gyroscope by simple adjustment of the current Io.

If one prefers to tune the gyroscope by the normal mechanical means consisting of adjusting the inertia of the intermediate ring 14 with respect to its plane of symmetry (at right angles to the axis z'z in the normal position) and this is by virtue of movable counterweights, it is thus possible to use the polarization current Io to compensate for the fact that in the control loop of the gyrometer, maintaining a torque corresponding to a given angular speed with respect to one axis, requires a deviation of the rotor with respect to its normal position (since the gain of the loop is not infinite). Under these conditions, there is an imbalance of the airgaps of the two opposed electromagnets and this imbalance produces a torque tending to introduce a precession on the other axis. To compensate for this parasite torque tending to act on the other axis, it is possible to introduce asymmetry in the polarization currents of the diametrically opposed electromagnets, this asymmetry being proportional to the inclination of the rotor along this other axis.

Thus, instead of supplying the two electromagnets with a fixed polarization current Io (to which one adds variable currents ΔI and −ΔI depending on the deviation of the rotor along an axis perpendicular to the axis comprising the two electromagnets), a polarization current will be used to which is assigned a correcting term under the positive sign on one electromagnet and under the negative sign on the other electromagnet, this correcting term being proportional to the angle of inclination of the rotor and the factor of proportionality being such that the force of attraction exerted by one electromagnet remains constant despite the airgap variation in this electromagnet.

Thus, only the normal control of the gyroscope, namely the production of a torque on one axis depending on the angular deviation on the other axis, produces effects, without a parasite reaction as regards the inclination along one axis on the inclination along the other axis.

In practice, the reference voltage (FIG. 5) will be varied in the positive for one electromagnet and in the negative for the other exactly in the same way as the airgap corresponding to the same electromagnet, in order that the current applied to this electromagnet is proportional to its airgap. When operating as a gyrometer, there will clearly be added to this current, variations of current in order to create torque for compensating for a precession along the axis at right angles to the axis comprising the electromagnets, as was explained with reference to FIG. 5.

Another method for constructing the linearization circuits 60 and 62 is illustrated in FIG. 6.

It comprises a system of supplying current by pulses, the difference in the time of passage of the current in two diametrically opposed electromagnets, during a pre-determined period of time, constituting a parameter varying in a linear manner with the mean torque produced by these two electromagnets, during this period.

The variation in the time of passage of the current may be established in two ways, one corresponding to the diagram of FIG. 6, in which the frequency of the pulses of constant width is varied, the other corresponding to the diagram of FIG. 7, in which the width of the pulses of fixed frequency is varied.

In the diagram of FIG. 6, one compares the voltage of the deviation of position of the rotor along a pre-determined axis, for example x'x (a similar arrangement being provided for the oher axis), a voltage which is provided by inclination detectors, with two threshold voltages (positive and negative) and by means of flip-flop devices 72 and 74 respectively, synchronised by a clock signal, one triggers pulses of constant width (for example one clock period each time the absolute value of the deviation voltage exceeds the positive threshold or negative threshold respectively. The pulses produced serve to control, during the period which they last, the application of a current, whose amplitude is defined by a reference voltage Vref, to the electromagnets on the axis y'y.

The linear measurement of the mean torque takes place by counting the difference in the number of pulses applied to diametrically opposed electromagnets.

This counting takes place by means of an up-down counter 76 which receives, on the "up" input, one pulse for each descending front of the pulses for controlling one of the electromagnets and on the "down" input, one pulse for each descending front of the pulses for controlling the diametrically opposed electromagnet.

As in the case of controlling analog linearization by the application of a polarization current, on which one superimposes a current depending on voltages of deviation of position of the rotor, in the case of FIG. 6, it is also possible to introduce a correction in order to take into account the fact that the gain of the control loop of the gyroscope is not infinite and that a residual deviation voltage remains present in order to produce the torque corresponding to the compensation of a precession. The residual inclination of the rotor gives rise to a variation in the airgap of the electromagnets of the corresponding axis, thus to a parasite torque introducing a precession on the other axis. This parasite torque is corrected by varying the amplitude of the control pulses or the reference voltage which produces them, depending on the corresponding airgap of the electromagnets, such that the amplitude is proportional to the airgap.

The corrected loop thus consists of varying simultaneously the frequency of the pulses depending on the inclination of the rotor along one axis and the amplitude of the pulses according to the inclination of the rotor along the other axis ( the axis which comprises the electromagnets controlled in this way). The parameter of measurement of the speed of precession remains the difference in the number of pulses applied to diametrically opposed electromagnets, even if the amplitudes of these pulses have a different value for these two electromagnets (a common value to which is respectively added or subtracted a term proportional to the inclination for one and the other electromagnet).

In the diagram of FIG. 7, control of the diametrically opposed electromagnets, those on the axis y'y for example, takes place by pulses of variable width in order to produce a difference in the time of passage of a current of pre-determined amplitude and pre-determined frequency between the two electromagnets.

To this end, the deviation signal coming from the inclination detectors and representing the deviation in the direction x'x is added to a saw-tooth signal after correction by the control corrector 56.

The signal resulting from this addition is compared with a positive threshold and negative threshold in comparators 78 and 80 which at their output supply square wave signals whose width depends on the periods during which these thresholds were exceeded by this signal. These square wave signals control bistable devices 82 and 84 supplying corresponding pulses for controlling the current in the electromagnets. These bistable devices respectively open gates 86 and 88 to allow the passage of clock pulses during the period of the square wave signals which they produce, the clock pulses thus transmitted being directed respectively, to the up and down inputs of an up-down counter 90 which thus measures the difference in widths of the times of passage of the current in the two electromagnets during a pre-determined period by subtracting the number of pulses representing the widths of successive current pulses.

This difference in the widths of the pulses during a certain period constitutes the parameter of the signal for controlling the diametrically opposed electromagnets, a parameter which represents a linear measurement of the mean torque exerted by the two diametrically opposed electromagnets.

Still in this embodiment, it is possible to compensate for the fact that the loop gain of the control system is not infinite, this is by providing a variation in the amplitude of the current pulses, as previously, depending on the airgap width of the electromagnets receiving these pulses.

To this end, as shown in FIG. 7 and according to the same principle as in the case of FIG. 6, by virtue of a correction circuit 92 receiving the deviation voltage along the axis y'y (representing the inclination along this axis) one establishes a correctional term proportional to this inclination (or to the variation of the airgap). This correctional term is added with a positive sign to the reference voltage which is connected to one of the electromagnets for the duration of the pulses controlling this electromagnet and with a negative sign to the reference voltage connected to the other electromagnet.

Naturally, a circuit similar to the arrangement of FIG. 7 is provided for controlling the electromagnets on the axis x'x.

In the embodiments of FIGS. 6 and 7 where the electromagnets are supplied with pulses, it is advantageous to provide an inverter controlled so as to reverse the direction of the current in one electromagnet upon each successive pulse. It is thus possible to eliminate the phenomena of hysteresis in the iron core of the electromagnet, which creates alternately upon each pulse, a field in one direction or the other, the direction of the field having no effect on the direction of the force of attraction on the rotor.

What is claimed is:

1. A gyroscope comprising a rotor driven by a drive shaft through the intermediary of an intermediate ring connected to the motor and to the rotor by torsion bars at 90° with respect to each other, said torsion bars providing a return torque for the rotor, and precession motors for applying precession torques to the rotor in planes containing the axis of rotation of the drive shaft, wherein the precession motors are fixed electromagnets exerting a magnetic attraction on a ferromagnetic part of the rotor, with an airgap between said part and the electromagnets, and wherein the electromagnets are located in groups of two diametrically opposite to each other with respect to the drive shaft of the rotor, two diametrically opposed electromagnets receiving a common biasing current added to a variable amount of current which is positive for one electromagnet of a group and negative for the other, by means of an adder and a substractor each receiving on one input an electrical signal of a reference amplitude and on the other input an electrical signal of a variable amplitude, means being provided for measuring the said variable amplitude, and adjusting means for adjusting the biasing current to a value such that the torque produced by two opposite electromagnets receiving said biasing current compensates the return torque produced by the torsion bars when they are displaced from their central position.

2. A gyroscope according to claim 1, wherein means are provided to unbalance the biasing currents in one and the other electromagnets of a group of two opposite electromagnets, said means comprising means for detecting the inclination of the rotor and producing another electrical signal which is a linear function of said inclination, means for adjusting the amplitude of said other electrical signal according to said inclination, means for adding said other signal to said biasing current and means for substracting said other signal from said biasing current.

* * * * *